July 24, 1951 R. SEALE ET AL 2,561,421
RECEIVER TRANSMITTER ARRANGEMENT
Filed April 2, 1945 2 Sheets-Sheet 2

*INVENTOR.*
RAY SEALE
EDWARD J. PEKOL
BY William D. Hall
ATTORNEY

Patented July 24, 1951

2,561,421

UNITED STATES PATENT OFFICE 2,561,421

RECEIVER-TRANSMITTER ARRANGEMENT

Ray Seale, Dayton, Ohio, and Edward J. Pekol, Chicago, Ill.

Application April 2, 1945, Serial No. 586,256

5 Claims. (Cl. 250—17)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to radio transponder beacons.

By a transponder, we mean a combined receiver-transmitter, capable of receiving a challenge pulse from an interrogator, and automatically transmitting a signal on the same or different frequency. By a responsor, as hereinafter used, is meant a radio receiver which receives the transmitted signal returned from the transponder and produces an output suitable for feeding to a display system. The responsor is usually combined into a single unit with the interrogator. This unit is known as the interrogator-responsor.

The present invention was designed as a battery-powered pulsed radio wave beacon of the triggered transponder type, of such size, weight, stability, operative life, range and simplicity as to make it practicable for inclusion in life rafts for the saving of life at sea or in aircraft flying over heavily wooded, mountainous, or otherwise inaccessible areas to facilitate position location by search craft.

Rescue radio equipment presently in use to save the lives of stranded personnel away from civilization in places such as on the broad expanse of an ocean or in non-accessible land areas lack sufficient range, are not automatic in nature, are inaccurate, do not have two-way communications means, are easily detected by the enemy and have short operating life. The device hereinafter described was designed specifically bearing in mind the inefficacies of such presently used equipment in order to overcome such deficiencies.

Accordingly, an object of this invention is to employ light weight, easily operated, accurate equipment for revealing range in miles and azimuth position of distressed personnel on a broad expanse of water or other remote location to a searching craft.

Another object is to provide means for receiving and automatically-transmitting a response signal to a search craft on a predetermined frequency so that the possibility of undesirable detection and position revelation is largely eliminated.

A further object is to provide monitoring means to ascertain whether signals are being received from and transmitted to search aircraft within the range of this equipment at or about a predetermined frequency.

A still further object is to provide simple means for monitoring and keying intelligent messages in code to a search aircraft while the equipment is automatically receiving triggering search signals and transponding distress signals.

A further object is to provide circuit means whereby the operating life of the power supply for this device is prolonged enabling the employment of smaller power supply means.

A still further object is to provide circuit means whereby the sensitivity of the equipment is maintained at a constant predetermined level in such a manner that as the power supply voltage decreases with usage, the bias voltage of the tube circuits automatically decreases.

Other objects and features of novelty will be apparent from the following description and the annexed drawings, it being clearly understood, however, that the invention is not limited in any way by such description and drawings, or otherwise, than by the appended claims.

In the accompanying drawings in which similar reference numerals refer to like parts;

Figure 1:
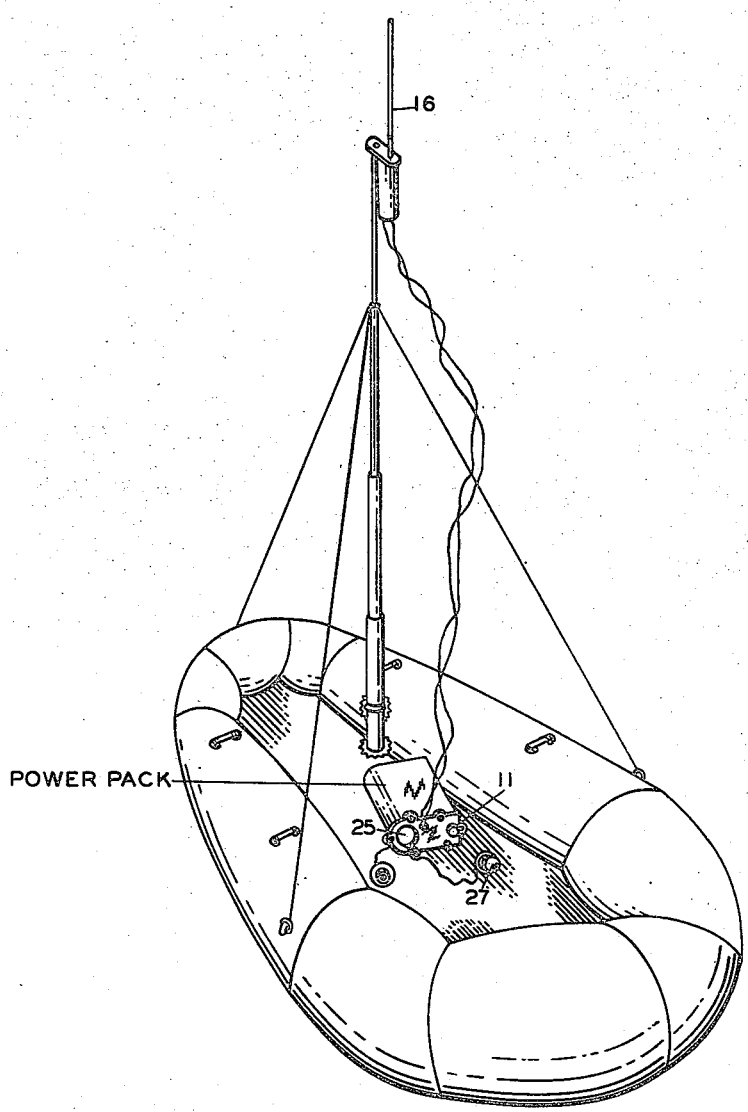
Fig. 1 is a drawing of a life raft in perspective showing the present equipment installed therein.
Figure 2:
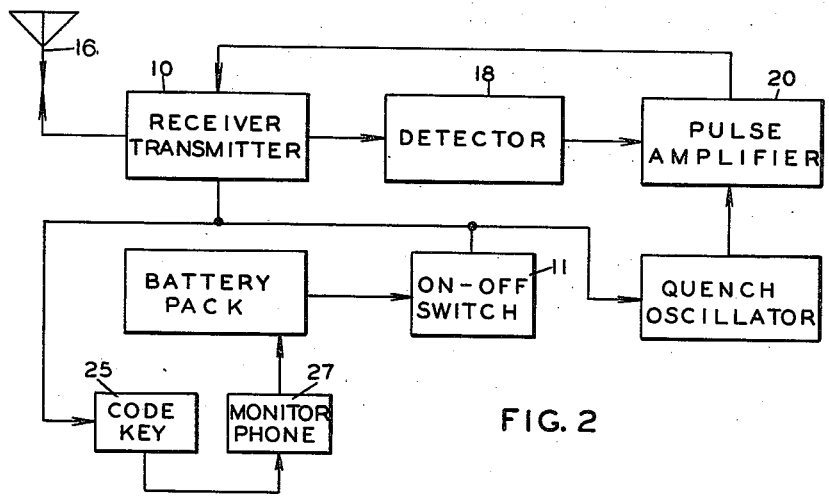
Fig. 2 is a diagram designating in block form the interconnection of the components of this invention.
Figure 3:
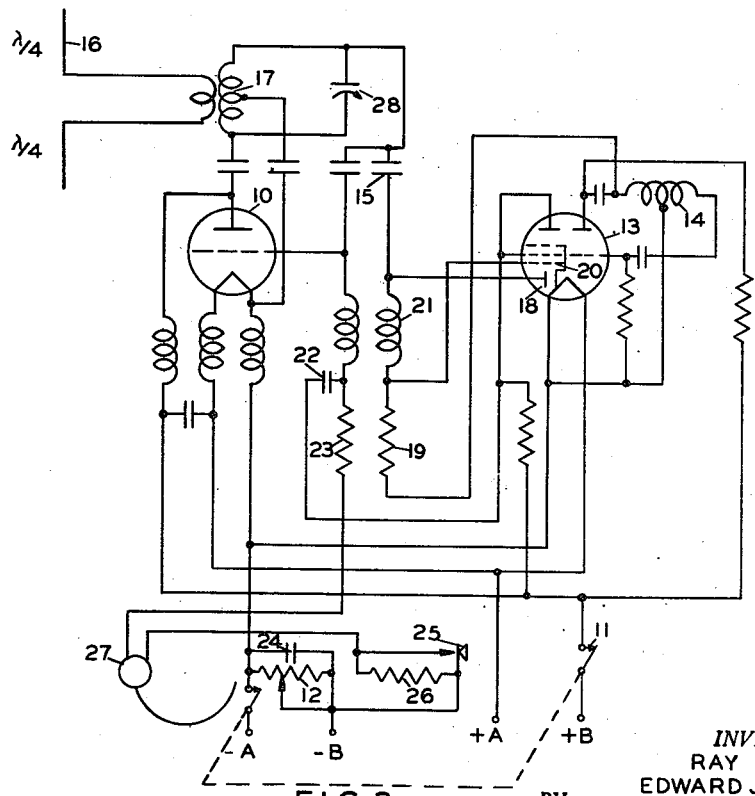
Fig. 3 is a schematic diagram of the invention.

The equipment covered by the present invention normally receives pulsed wave signals transmitted by the search aircraft interrogator equipment and transmits pulsed wave response signals to the search craft which are viewed by the search craft's radio operator on an oscilloscope screen which is calibrated in mileage and in azimuth. Thus, for example, when the response signal is received by a search aircraft by the two antennas ordinarily provided on the fuselage of the aircraft, the receiver oscilloscopic indication will show whether the transponder beacon is to the right or left of said search aircraft and the distance in miles from such distressed transponder beacon to the search aircraft.

A single midget size tube which contains all electrode elements in a glass envelope from which contact connections are taken directly rather than from a tube base, is employed as both a receiver and transmitter. For simplicity of explanation, the circuit is first considered herein as a receiver only. As a receiver, it is of the superregenerative type, being quenched by a separate low frequency oscillator; this type of receiver is preferred due to the high sensitivity obtainable from a limited tube complement and its ability to receive over a wide band width on either side of the predetermined frequency to which it is tuned.

Normally receiver-transmitter tube 10 is in "receive" position when switch 11 is closed to the "on" position. Tube 10 is biased far below cut-off by the bias from dropping resistor 12. Since the operating voltage for this device is battery supplied, and over a period of operating time the voltage will decrease because the battery is nearing exhaustion, a lower bias voltage corresponding to the decreased battery voltage must be maintained to keep tube 10 at its normal predetermined sensitivity. In view of the fact that the entire device draws current through bias resistor 12 producing a voltage drop across resistor 17, as the battery voltage decreases, current drain through the device decreases, in turn decreasing the voltage drop across bias resistor 12 thus decreasing the bias on tube 10. In "receive" condition of receiving-transmitting tube 10, the triode portion of tube 13 and coil 14 form an oscillating tank circuit to supply an amplified oscillating quench voltage to the grid of receiver-transmitter tube 10, which quench voltage is amplified through the pentode amplifier portion of tube 13 and coupled to the grid of tube 10 through coupling condenser 22. The quench voltage varies from negative to positive and when applied to the grid of tube 10, the positive half cycles serve to overcome the bias on tube 10 sufficiently to place tube 10 in a highly sensitive receiving position. Self-oscillations, however, cannot build up in tube 10 because the negative half cycles of this sine wave quench voltage quickly drive the tube below cut-off again. The quench voltage may be set to a frequency that builds up and cuts off receiver-transmitter tube 10 at the rate of 350,000 cycles per second. There would, therefore, be no possibility that receiving-transmitting tube 10 would fail to be in a position to receive at the pulse repetition rate of the search signal during the periods when tube 10 is biased below cut-off since the search signals would be transmitted at the rate of approximately 300 pulses per second while receiver-transmitter tube 10 would be in "receive" condition at the rate of 350,000 cycles per second.

When a search craft comes within the transmitter range of this equipment, which can be made 100 miles or more, the search pulses transmitted by the interrogator transmitter of the search craft are picked up by common receiving and transmitting quarter-wave length antenna 16 and inductively coupled through the input tuned radio-frequency network made up of coil 17 and condenser 28 to receiver-transmitter tube 10. The incoming pulse is amplified by tube 10 and fed through coupling condenser 15 to diode plate 18 of the diode portion of tube 13 so that the positive half cycles of the received pulse are short-circuited and the negative half cycles are impressed across load resistor 19 forming the negative pulse which is applied to the control grid 20 of the pentode amplifier portion of tube 13. Choke coil 21 presents a high impedance to high frequencies to keep these frequencies from being impressed on control grid 20 of the pentode amplifier portion of tube 13. Since triodes are characterized by low impedance plate circuits while pentodes have high impedance plate circuits, and since the grid circuit of receiver-transmitter tube 10 is a low impedance circuit, and it is desirable to match this impedance for maximum power output, the pentode amplifier portion of tube 13 is used as a triode rather than as a pentode by joining together its plate and screen grid electrodes. The negative pulse is amplified and phase-inverted by the amplifier portion of tube 13 and impressed as a positive pulse on the control grid of receiving-transmitting tube 10 through coupling condenser 22. This amplified positive pulse overcomes the negative bias on the control grid of tube 10 driving said control grid far above cut-off causing tube 10 and the tank network consisting of coil 17 and condenser 28 to go into strong oscillations which are coupled to and radiated by antenna 16. The transmitted pulse voltage is fed simultaneously to diode plate 18 of tube 13 in the same manner as the received search pulse, producing a larger negative pulse which is again amplified and phase inverted and fed back to the grid of receiver-transmitter tube 10 driving said grid still more positive. These cycles continue until the amplifier portion of tube 13 has reached the peak of its amplifying ability or saturation. This constant feeding back of the transmitted pulse voltage serves to maintain a constant signal output strength regardless of the strength of the received search signal. When the amplifier portion of tube 13 has reached saturation, the positive output pulse amplitude levels off. This same positive pulse voltage has by this time fully charged up coupling condenser 22 to a steady value so that no more positive voltage appears on the control grid of receiver-transmitter tube 10. However, said control grid of tube 10 is of positive polarity and draws current producing a voltage drop across resistor 23 which is negative with respect to ground at its terminal closest to the grid of receiver-transmitter tube 10. This negative voltage is impressed on said grid of tube 10 biasing tube 10 to non-conductance or cut-off. At this point the quench voltage swinging from negative to positive will cause tube 10 to conduct on the positive voltage swings at the rate of 350,000 pulses per second or at whatever repetition frequency the quench voltage operates, and tube 10 is now once more in a position to receive the incoming search pulses. Thus the oscillation is transmitted in the form of short bursts of R.-F. power, or pulses similar to the received search pulses but of longer duration. To prevent degeneration through the bias voltage supply, condenser 24, is utilized to hold said bias voltage constant during the transmitting cycle of receiver-transmitter tube 10.

In the event it is desired to key an intelligent response or predetermined identification code letter to the search aircraft, code key 25 is depressed to increase the width of the transmitted pulses. Depressing code key 25 shunts out resistance 26 lowering the impedance of the grid of receiver-transmitter tube 10. As a result, the rectified and amplified pulses from tube 13 do not reach their peak value across grid resistor 23 as quickly as under normal resistance conditions thus causing condenser 22 and the pentode amplifier portion of the tube 13 to require a longer period to reach the saturation charging point, thus increasing the width of the transmitted response pulse. The increase of the width of the transmitted response pulses appears as an increase of the width of said pulses on the oscilloscope screen of the search aircraft, so that code key 25 is retained in closed position for a longer period of time for a Morse code "dash," appearing as a greater increase of pulse width on said oscilloscope screen, and for a shorter period of time denoting a "dot," and appearing as a lesser increase of pulse width on the oscilloscope screen. A low impedance midget earphone 27 in series with the grid of tube 10 through resistor 23 is employed to listen to the search signal and to keying by code key 25. The low impedance type of earphone is desirable because of its small size and weight. This type of earphone is likewise advantageous in this circuit because it requires no step-up transformer as in conventional transponder circuits, and which in addition require that the transformer be connected to the plate circuit of an amplifier tube to obtain the required high current output. Additional space and weight burden for the transformer would then be necessitated and space and minimum weight are of the essence in rescue beacons.

This invention is adapted for incorporating as a part thereof either a horizontally or vertically polarized antenna in accordance with pre-arranged plan; a horizontal antenna being employed on this beacon transponder to correspond with the search aircraft's horizontal antenna or a vertically polarized antenna being used to correspond to the search aircraft's vertically polarized antenna to yield maximum signal sensitivity and power.

Having thus described our invention, we claim:

1. In a transponder beacon responsive to and triggered into oscillations by incoming search pulses, said beacon comprising a superrengerative radio receiver-transmitter having a quench voltage oscillator for generating sine wave quench voltage, a vacuum tube having a control grid normally biased below cut-off, amplifier means coupling the output of said quench voltage oscillator to said control grid for overcoming the bias on said grid during the positive half cycles of said voltage to place said tube in a condition to receive said search pulses, detector means coupled to the output of said tube for detecting said search pulses; said amplifier means being coupled to the output of said detector for amplifying said detected search pulses and impressing them simultaneously with said amplified quench voltage on said grid, thereby rendering said tube conductive and causing it to transmit response pulses.

2. In combination with a transponder having a common vacuum tube for receiving and transmitting pulse modulated carrier frequency wave signals, a detector connected to the output of said tube for detecting received signals, a quench voltage oscillator for generating quench oscillations, and a single amplifier having its input connected to the outputs of said quench voltage oscillator and said detector and its output to said tube for supplying both quench oscillations and detected signals thereto.

3. A transponder for receiving and transmitting pulse modulated carrier frequency signals comprising a receiver having resonant circuit means coupled to a vacuum tube, said vacuum tube being normally biased to cut-off, an amplifier having its output coupled to the input of said vacuum tube, quench voltage oscillator means coupled to said amplifier for providing super-regeneration to said tube for signal reception, a detector coupling the output of said vacuum tube to the input of said amplifier for respectively detecting and amplifying received wave signals; and a transmitter comprising said resonant circuit means coupled to said vacuum tube, said transmitter being driven into oscillation when the bias of said vacuum tube is overcome by the combined quench oscillation and detected signal output of said amplifier, and self-biasing means connected to said vacuum tube for terminating said transmitter oscillations after a predetermined period, thereby again placing said transponder in condition for signal reception.

4. A transponder for receiving and transmitting pulse modulated carrier frequency wave signals comprising a receiver having resonant circuit means coupled to a vacuum tube with a control grid, a resistive-capacitive network connected to said control grid, means connected to said resistive-capacitive network for providing a bias to said control grid sufficient to render said vacuum tube non-conductive, an amplifier having its output coupled to said grid, a quench voltage oscillator coupled to the input of said amplifier for providing quench voltage oscillations, thereby placing said vacuum tube in condition for wave signal reception during a portion of each cycle of said quench oscillations, a detector coupled between the output of said vacuum tube and said amplifier input for respectively detecting and amplifying received wave signals; and a transmitter comprising said resonant circuit means coupled to said biased vacuum tube, said transmitter being driven into oscillation when the combined quench voltage and detected signal output of said amplifier supplied to said control grid overcomes said bias, and being again rendered non-conductive when sufficient grid current flows from said control grid through said resistive-capacitive network to bias said tube to cut-off.

5. A transponder according to claim 4 and further including a key for shorting a portion of the resistance of said resistive-capacitive network.

RAY SEALE.
EDWARD J. PEKOL.

REFERENCES CITED

The following references are of record in the file of this patent:

UNITED STATES PATENTS

| Number | Name | Date |
| --- | --- | --- |
| 2,160,663 | Jensen | May 30, 1939 |
| 2,252,083 | Luck | Aug. 12, 1941 |
| 2,415,667 | Wheeler | Feb. 11, 1947 |
| 2,416,794 | Crosby | Mar. 4, 1947 |
| 2,425,315 | Atwood et al. | Aug. 12, 1947 |

FOREIGN PATENTS

| Number | Country | Date |
| --- | --- | --- |
| 371,476 | Great Britain | Apr. 28, 1932 |
| 521,139 | Great Britain | May 13, 1940 |

OTHER REFERENCES

Electronic Industries, September 1943, pp. 76 and 77.